(12) United States Patent
Huang et al.

(10) Patent No.: US 10,330,207 B2
(45) Date of Patent: Jun. 25, 2019

(54) PLUG MEMBER OF GAS VALVE

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Yunlin County (TW)

(73) Assignee: GRAND MATE CO., LTD., Taichung (TW)

( * ) Notice: Subject to any disclaimer, the term of this patent is extended or adjusted under 35 U.S.C. 154(b) by 96 days.

(21) Appl. No.: 15/333,534

(22) Filed: Oct. 25, 2016

(65) Prior Publication Data

US 2017/0114906 A1 Apr. 27, 2017

(30) Foreign Application Priority Data

Oct. 26, 2015 (TW) .............................. 104135146 A

(51) Int. Cl.
*F16K 5/02* (2006.01)
*F16K 5/10* (2006.01)
(Continued)

(52) U.S. Cl.
CPC .......... *F16K 5/0207* (2013.01); *F16K 5/0214* (2013.01); *F16K 5/103* (2013.01);
(Continued)

(58) Field of Classification Search
CPC ...... F16K 5/0207; F16K 5/1023; F16K 5/222; F16K 5/0214; F16K 5/106; F16K 5/103;
(Continued)

(56) References Cited

U.S. PATENT DOCUMENTS 5,009,393 A * 4/1991 Massey ................. F16K 5/0214
137/625.3
6,520,481 B2 * 2/2003 Harneit ................... F16K 5/103
137/599.17
(Continued)

FOREIGN PATENT DOCUMENTS

CN 2893349 Y 4/2007
CN 101506556 A 8/2009
(Continued)

OTHER PUBLICATIONS

Examination Report for TW104135146, dated Apr. 18, 2016, Total of 4 pages.
(Continued)

*Primary Examiner* — Marina A Tietjen
(74) *Attorney, Agent, or Firm* — Tracy M. Heims; Apex Juris, pllc.

(57) ABSTRACT

A plug member of a gas valve, having an axial bore, a first bore and a second bore located in a radial direction thereof to respectively communicate with the axial bore, and a first guiding slot and a second guiding slot recessed into an outer peripheral surface thereof. The first bore is larger than the second bore, and communicates with one end of the first guiding slot, while another end thereof is near the second bore. The first guiding slot becomes narrower from the first end to the second end. The second guiding slot has one end communicating with the second bore, and another end located between said first end and said second end.

7 Claims, 7 Drawing Sheets

(51) Int. Cl.
*F16K 5/22* (2006.01)
*F23N 1/00* (2006.01)
(52) U.S. Cl.
CPC .............. *F16K 5/222* (2013.01); *F23N 1/007* (2013.01); *F23N 2035/16* (2013.01); *F23N 2035/24* (2013.01)
(58) Field of Classification Search
CPC ...... F23N 1/005; F23N 1/007; F23N 2035/16; F23N 2035/14; F23N 2035/24
See application file for complete search history.

(56) References Cited

U.S. PATENT DOCUMENTS

| | | | |
|---|---|---|---|
| 6,845,966 B1* | 1/2005 | Albizuri | F16K 5/162 137/599.17 |
| 2002/0033464 A1 | 3/2002 | Harneit | |
| 2006/0175566 A1* | 8/2006 | Albizuri | F16K 5/0214 251/207 |
| 2009/0140193 A1* | 6/2009 | Albizuri Landa | F16K 5/0214 251/209 |
| 2013/0260327 A1* | 10/2013 | Aguayo | F23N 1/007 431/280 |
| 2014/0252253 A1 | 9/2014 | Huang et al. | |
| 2015/0330629 A1* | 11/2015 | Albizuri Landazabal | F16K 5/0407 431/280 |

FOREIGN PATENT DOCUMENTS

| | | |
|---|---|---|
| CN | 203718023 U | 7/2014 |
| CN | 104061340 A | 9/2014 |
| GB | 1260296 A | 1/1972 |
| GB | 1261141 A * | 1/1972 ............ F16K 5/103 |
| GB | 1329243 A | 9/1973 |
| GB | 2015702 A | 9/1979 |
| TW | 472853 U | 1/2002 |
| TW | 582525 U | 4/2004 |
| TW | M242664 U | 9/2004 |
| TW | M276159 U | 9/2005 |
| TW | M484062 U | 8/2014 |

OTHER PUBLICATIONS

Search Report for TW104135146, dated Apr. 18, 2016, Total of 1 page.
English Abstract for CN2893349, Total of 1 page.
English Abstract for CN101506556, Total of 1 page.
English Abstract for CN104061340, Total of 1 page.
English Abstract for CN203718023, Total of 1 page.
English Abstract for GB1260296, Total of 1 page.
English Abstract for GB1329243, Total of 1 page.
English Abstract for GB2015702, Total of 1 page.
English Abstract for TW472853, Total of 1 page.
English Abstract for TW582525, Total of 1 page.
English Abstract for TWM242664, Total of 1 page.
English Abstract for TWM276159, Total of 1 page.
English Abstract for TWM484062, Total of 1 page.
Chinese Office Action for CN201510730804.1, dated May 3, 2018, Total of 40 pages.
European Search Report for EP16195449, dated Mar. 27, 2017, Total of 8 pages.

* cited by examiner

PLUG MEMBER OF GAS VALVE

BACKGROUND OF THE INVENTION

1. Technical Field

The present invention generally relates to a gas valve, and more particularly to a plug member of gas valve.

2. Description of Related Art

It's well known that a plug member installed in a gas valve is adapted to regulate the gas flow passing therethrough. Taiwan utility model patent M276159 discloses such a conventional plug member which is adapted to be installed in a main body of a gas valve, including a gas channel provided therein, wherein a first vent and a second vent communicating with the gas channel are provided on an outer wall of the plug member. A variable area slot is further provided on the outer wall of the plug member. The disclosed plug member is adapted to regulate gas flow passed through the gas valve in a nearly linear way, for the cross area of the variable area slot is specifically designed, wherein the first vent allows high gas flow to flow into the gas channel, the second vent allows low gas flow to flow into the gas channel, and the gas supply does not cut off while rotating the plug member between the first vent and the second vent.

As shown in FIG. 1, in practice, lubricant is applied to an outer peripheral surface 10a of the plug member 10 to increase the lubrication between the plug member 10 and the main body of the gas valve. However, for the conventional plug member 10, a top margin of the variable area slot 104 near the second vent 102 is perpendicular to the rotating direction of the plug member 10, making lubricant accumulate in the variable area slot 104 at locations near the second vent 102. Once lubricant accumulates too much, the gas channel would be blocked, which would cause the gas flow to drop dramatically or even to be cut off completely while rotating the plug member 10.

BRIEF SUMMARY OF THE INVENTION

In view of the reasons mentioned above, the primary objective of the present invention is to provide a plug member of a gas valve, wherein the plug member could regulate the gas flow in a linear way, and could prevent the gas flow from dropping dramatically or being cut off.

The present invention provides a plug member of a gas valve, having an axial bore located in an axial direction thereof, a first bore, and a second bore, which are located in a radial direction thereof, wherein the first bore and the second bore communicate with the axial bore, respectively. A cross-sectional diameter of the first bore is larger than a cross-sectional diameter of the second bore. The plug member includes a first guiding slot and a second guiding slot, which are recessed into an outer peripheral surface of the plug member, wherein the first guiding slot extends from the first bore to the second bore, and has a first end and a second end. The first end communicates with the first bore. The second end is near the second bore without physically communicating with the second bore. A width of the first guiding slot decreases gradually from the first end to the second end. The second guiding slot extends from the second bore to the first bore, and has a third end and a fourth end. The third end communicates with the second bore. The fourth end is located between the first end and the second end of the first guiding slot without physically communicating with the first guiding slot, wherein the second end of the first guiding slot is a tip.

With the aforementioned design, the first guiding slot could regulate the gas flow in a linear way. By further providing the second guiding slot, even when the second end of the first guiding slot has large amount of lubricant accumulated therein, gas would flow into the axial bore thereof through the second guiding slot and the second bore. Whereby, the gas flow passing through the plug member could be prevented from dropping dramatically or being cut off.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
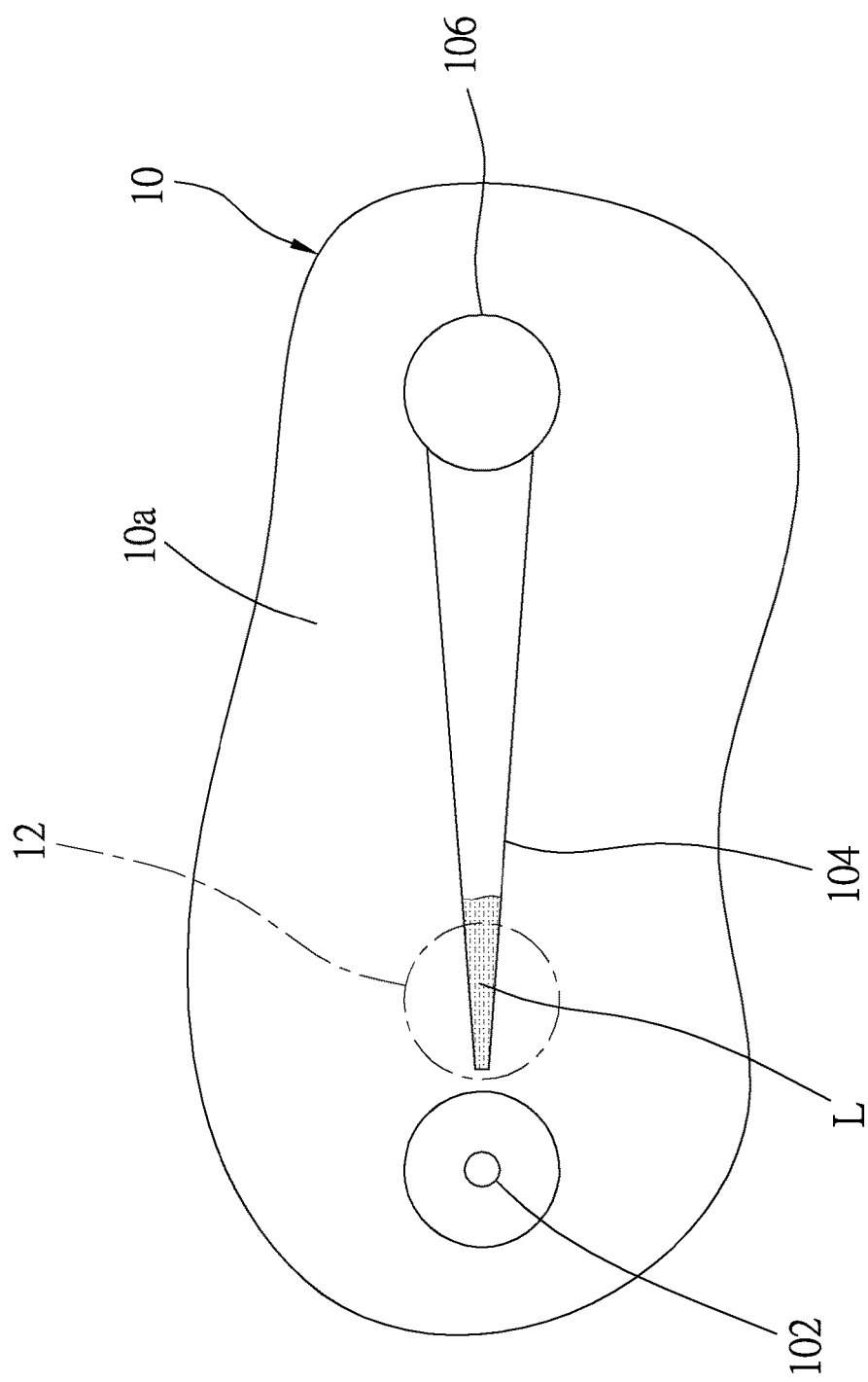
FIG. 1 is a partial expanded view of the outer peripheral surface of a conventional plug member.
Figure 2:
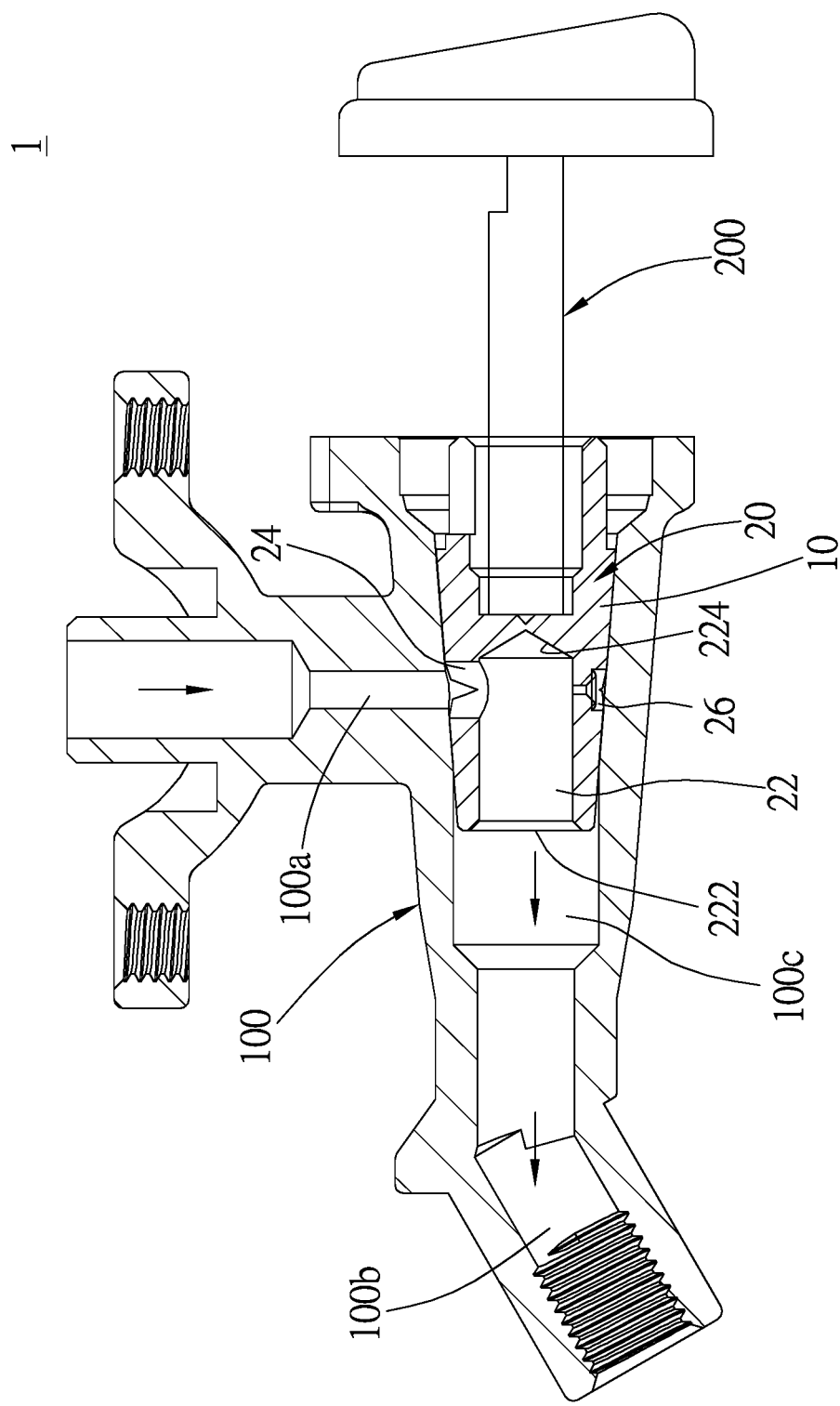
FIG. 2 is a sectional view of the gas valve applied with the plug member of a first embodiment of the present invention.
Figure 3:
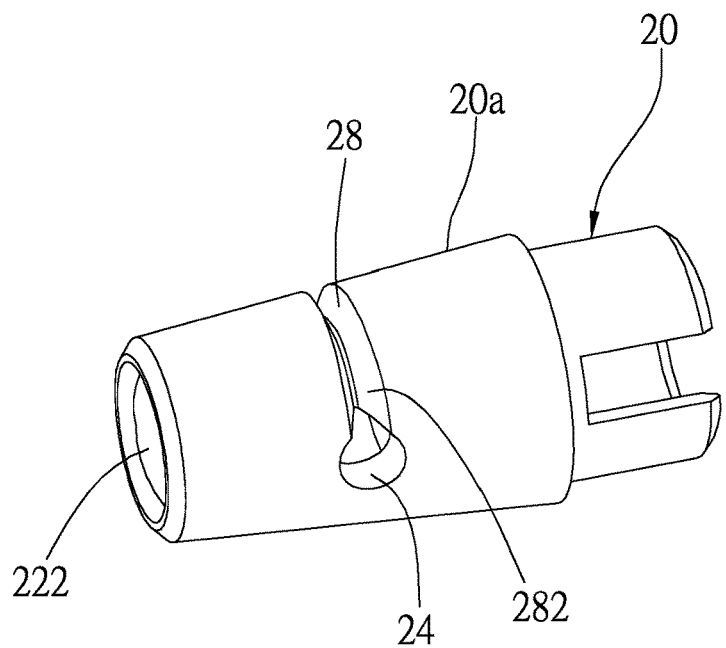
FIG. 3 is a perspective view of the plug member of the first embodiment.
Figure 4:
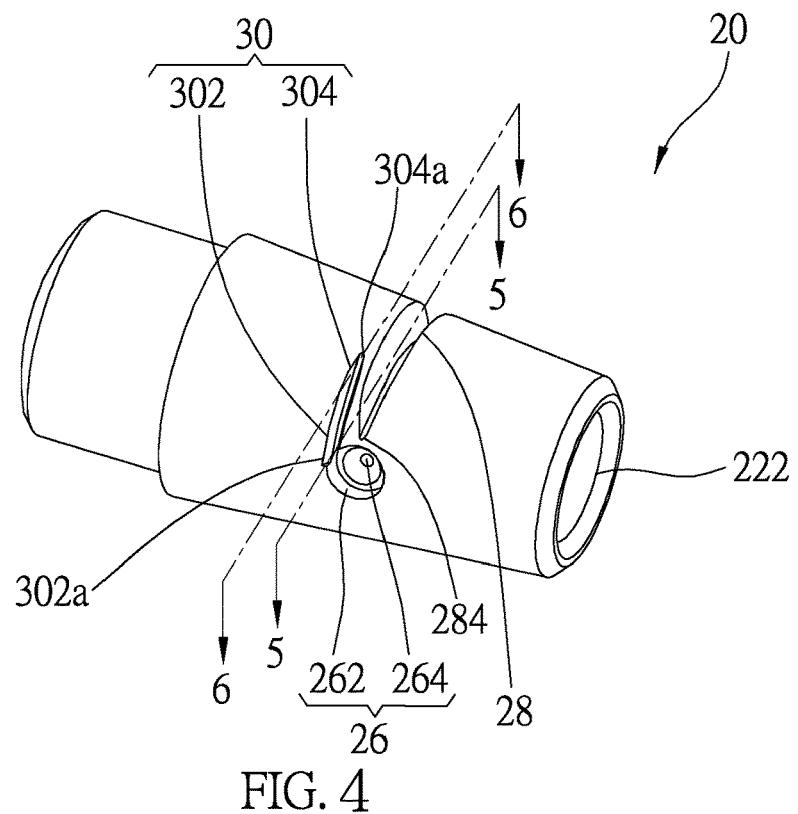
FIG. 4 is a perspective view, showing the plug member of the first embodiment in another direction.
Figure 5:
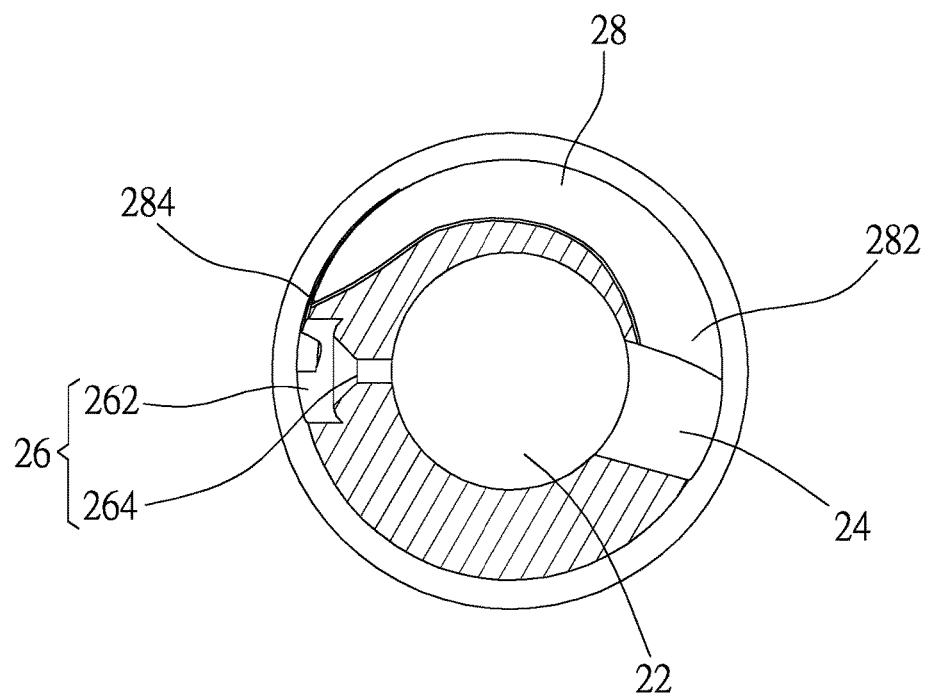
FIG. 5 is a sectional view along the 5-5 line of FIG. 4.

A gas valve 1 with a plug member 20, which is the first embodiment of the present invention, is illustrated in FIG. 2. The gas valve 1 has a valve body 100 and a driving lever 200, wherein the valve body 100 has a first airway 100a, a second airway 100b, and a chamber 100c communicating the first airway 100a and the second airway 100b. The plug member 20 is located in the chamber 100c of the valve body 100 wherein lubricant is applied to an outer peripheral surface 20a of the plug member 20 to make the plug member 20 rotate smoothly. The driving lever 200 is connected to the plug member 20 to rotate the plug member 20. In the first embodiment, gas flows in the gas valve 1 through the first airway 100a, and flows out through the second airway 100b. However, this is not a limitation of the present invention. Gas could flow in the gas valve 1 through the second airway 100b, and flow out through the first airway 100a in other embodiments.

As shown in FIG. 3 to FIG. 7, the plug member 20 has an axial bore 22 located in an axial direction thereof, a first bore 24, a second bore 26, which are located in a radial direction thereof, a first guiding slot 28, and a second guiding slot 30, which are recessed into the outer peripheral surface 20a of the plug member 20. The axial bore 22 has an open end 222 and a closed end 224, wherein the open end 222 corresponds to the second airway 100b of the gas valve 1. The first bore 24 and the second bore 26 communicate with the axial bore 22, respectively. In the first embodiment, the second bore 26 includes a first bore section 262 and a second bore section 264, wherein the first bore section 262 communicates with the second bore section 264. A cross-sectional diameter of the first bore section 262 is greater than a cross-sectional diameter of the second bore section 264, wherein the second bore section 264 has the smallest cross-sectional diameter, which is adapted to restrict gas flow that passes through the second bore 26. A cross-sectional diameter of the first bore 24 is greater than the cross-sectional diameter of the second bore section 264 of the second bore 26.

Figure 7:
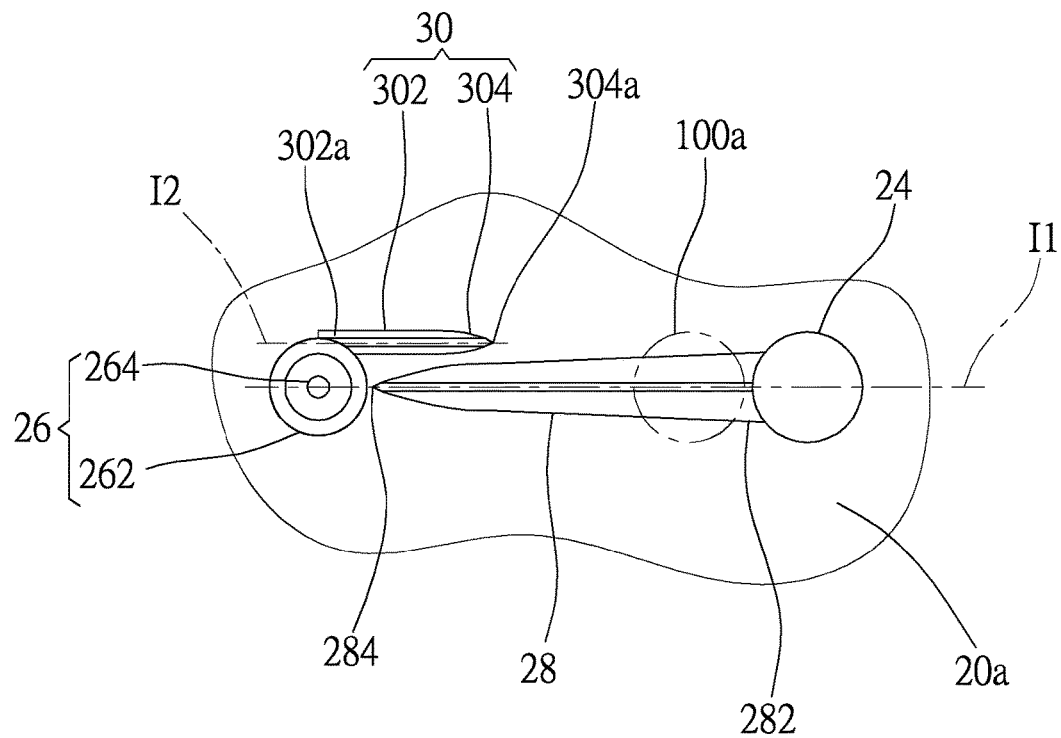
FIG. 7 is a partial expanded view of the outer peripheral surface of the plug member of the first embodiment of the present invention.

As shown in FIG. 7, the first guiding slot 28 extends from the first bore 24 to the second bore 26 along the outer peripheral surface 20a, wherein an extension line I1 of the first guiding slot 28 is defined to pass through a center of the first bore 24 and a center of the second bore 26. The first guiding slot 28 has a first end 282 and a second end 284, wherein the first end 282 communicates with the first bore 24. The second end 284 is near the second bore 26 without physically communicating with the second bore 26. A width of the first end 282 is greater than a width of the second end 284, wherein the width decreases gradually from the first end 282 to the second end 284 to form a tip at the second end 284. A depth of the first guiding slot 28 decreases gradually from the first end 282 to the second end 284.

Figure 6:
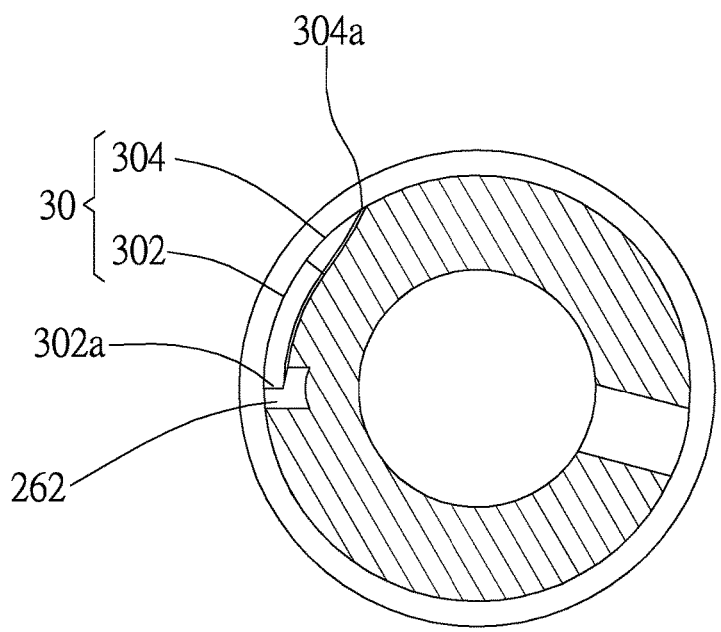
FIG. 6 is a sectional view along the 6-6 line of FIG. 4.

The second guiding slot 30 extends from the second bore 26 to the first bore 24 along the outer peripheral surface 20a, wherein an extension line I2 of the second guiding slot 30 is defined parallel to the extension line I1 of the first guiding slot 28, which means an extending direction of the second guiding slot 30 is parallel to an extending direction of the first guiding slot 28. In the first embodiment, the second guiding slot 30 has a first slot section 302 connected to a second slot section 304. The first slot section 302 has a third end 302a, while the second slot section 304 has a fourth end 304a. The third end 302a communicates with the first bore section 262 of the second bore 2. The fourth end 304a is located between the first end 282 and the second end 284 of the first guiding slot 28 without physically communicating with the first guiding slot 28. The first slot section 302 has a consistent width. A width of the second slot section 304 decreases gradually from the first slot section 302 to the fourth end 304a to form a tip at the fourth end 304a. The second guiding slot 30 has a consistent depth in the first slot section 302. A depth of the second guiding slot 30 decreases gradually from the first slot section 302 to the fourth end 304a of the second slot section 304 (as shown in FIG. 6).

Due to the difference between the cross-sectional diameter of the first bore 24 and the cross-sectional diameter of the second bore section 264 of the second bore 26, and the variation of the width of the first guiding slot 28, the gas flow passing through the plug member 20 through the first airway 100a could be linearly regulated while rotating the plug member 20. When the first guiding slot 28 and the second guiding slot 30 of the plug member 20 is rotated to a projection area of the first airway 100a, gas would flow out through the axial bore 22 of the plug member 20, passing through the first guiding slot 28 and the second guiding slot 30 synchronously.

Figure 8:
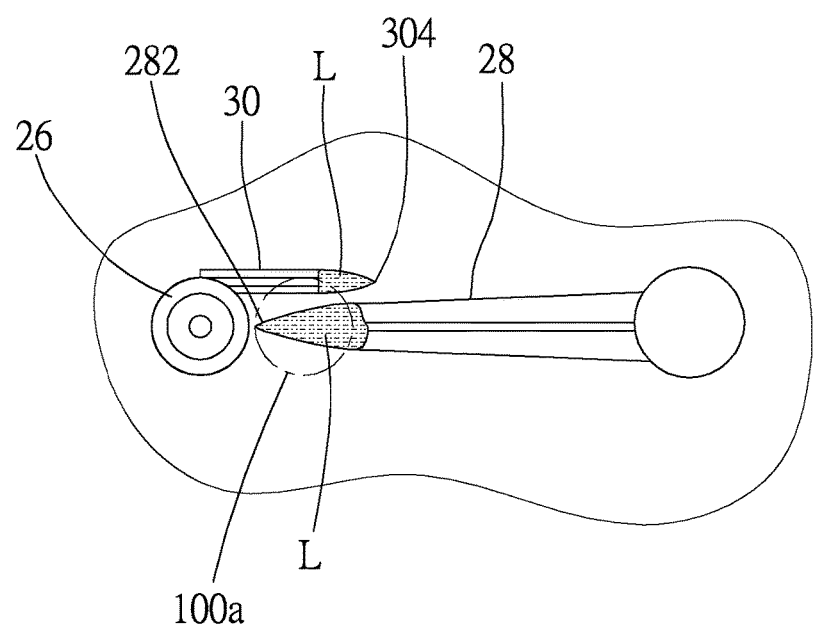
FIG. 8 is a schematic diagram, showing lubricant enters the first guiding slot and the second guiding slot.

It is worth mentioning that, the tip formed by the second end 284 of the first guiding slot 28 or the fourth end 304a of the second guiding slot 30 could reduce the chance of accumulating too much lubricant in the second end 284 of the first guiding slot 28 or the fourth end 304a of the second guiding slot 30. As shown in FIG. 8, even when the second end 284 of the first guiding slot 28 or the fourth end 304a of the second guiding slot 30 has large amount of lubricant L accumulated thin, gas flowing in the first airway 100a would still flow into the axial bore 22 of the plug member 20 through the second guiding slot 30 and the second bore 26, whereby the gas flow passing through the plug member 20 could be prevented from dropping dramatically or being cut off.

Figure 9:
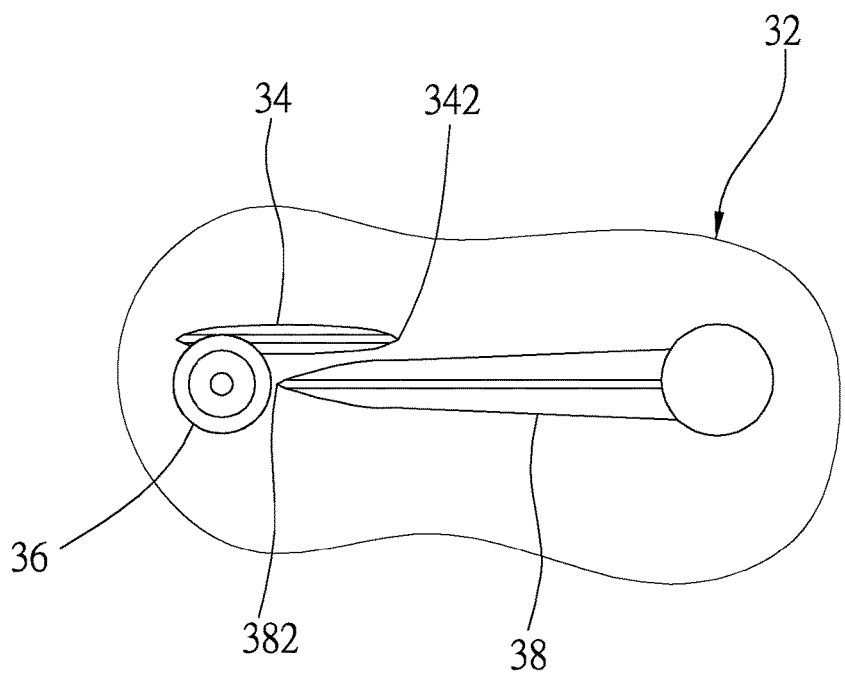
FIG. 9 is a partial expanded view of the outer peripheral surface of the plug member of a second embodiment of the present invention.

A plug member 32 of a second embodiment of the present invention is illustrated in FIG. 9. The difference between the plug member 32 of the second embodiment and that of the first embodiment is that, a width of a second guiding slot 34 increases gradually from a fourth end 342 to a second bore 36 in the first slot section 302. Whereby, the second guiding slot 34 could provide more space for receiving lubricant, reducing the amount of lubricant entering the second end 382 of the first guiding slot 38.

Figure 10:
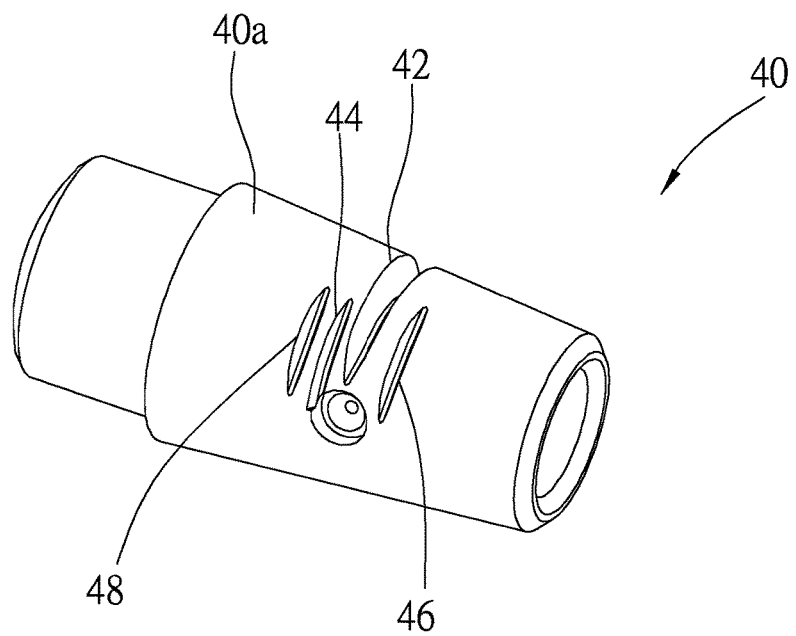
FIG. 10 is a perspective view of the plug member of a third embodiment.
Figure 11:
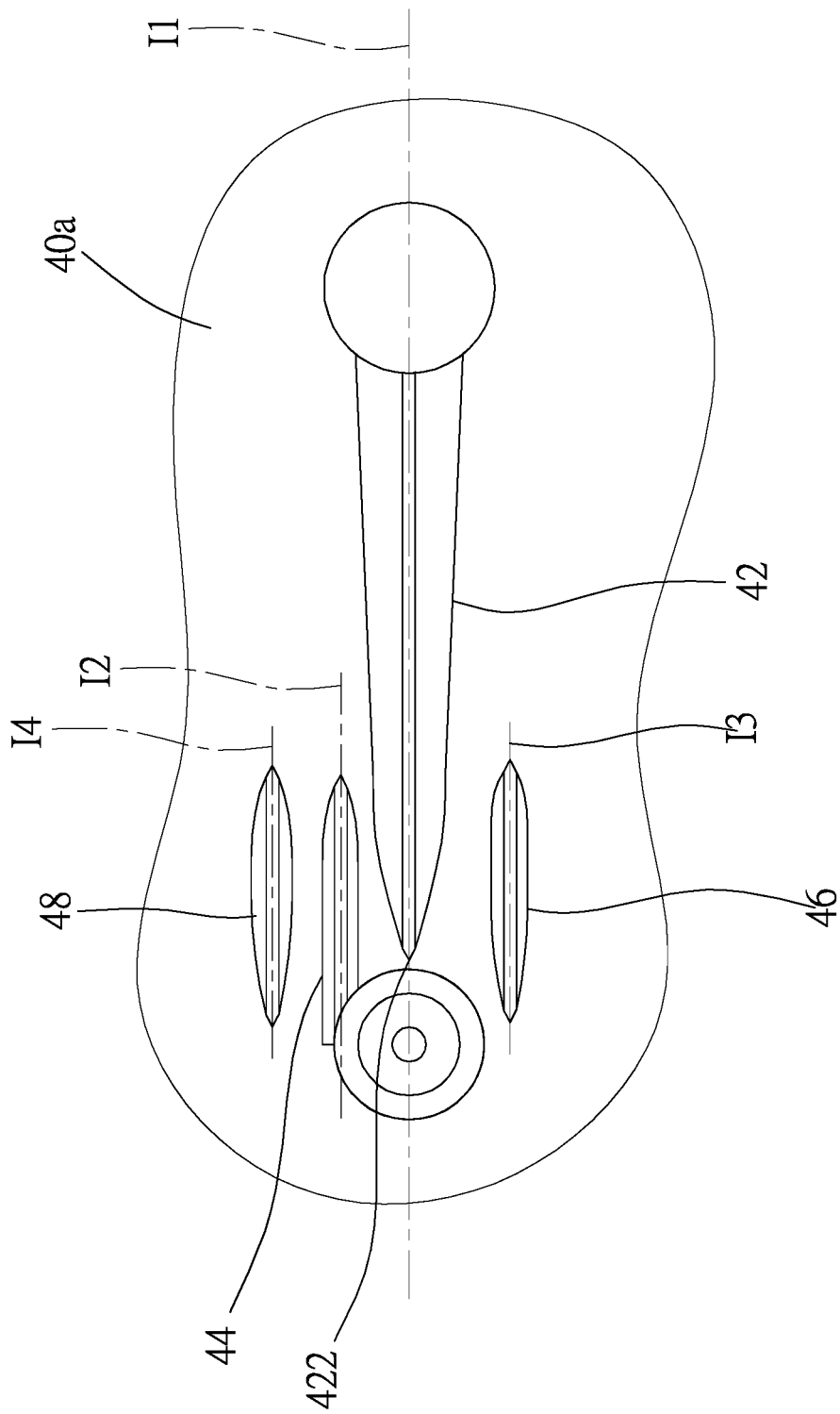
FIG. 11 is a partial expanded view of the outer peripheral surface of the plug member of the third embodiment.

A plug member 40 of a third embodiment of the present invention is illustrated in FIG. 10 and FIG. 11, which is designed based on the structure of said first embodiment. An outer peripheral surface 40a of a plug member 40 has not only a first guiding slot 42 and a second guiding slot 44, but also a first oil groove 46 and a second oil groove 48 recessed thereinto. The first oil groove 46 is located near a second end 422 of the first guiding slot 42. The second end 422 of the first guiding slot 42 is located between the first oil groove 46 and the second guiding slot 44. The second oil groove 48 is located near the second guiding slot 44. The second guiding slot 44 is located between the second oil groove 48 and the first guiding slot 42. In the third embodiment, the first oil groove 46 and the second oil groove 48 are out of a projection area of a first airway 100a while rotating the plug member 40. In practice, at least one part of each of the first oil groove 46 and the second oil groove 48 could also enter the projection area of the first airway 100a.

Extension lines I3, I4 of the first oil groove 46 and the second oil groove 48 are parallel to extension lines I1, I2 of the first guiding slot 42 and the second guiding slot 44. In other words, an extending direction of the first oil groove 46 is parallel to an extending direction of the second oil groove 48, the extending direction of the first guiding slot 42, and the extending direction of the second guiding slot 44.

The first oil groove 46 could provide space for receiving lubricant, which could reduce the amount of lubricant entering the first guiding slot 42, especially the second end 422. Similarly, the second oil groove 48 could further provide space for receiving lubricant, which could also reduce the amount of lubricant entering the second guiding slot 44. In practice, either the first oil groove 46 or the second oil groove 48 could be omitted to meet different requirements.

In conclusion, by further providing the second guiding slot, gas could still flow into the axial bore of the plug member of the present invention through the second guiding slot and the second bore even if the second end of the first guiding slot has large amount of lubricant accumulated therein. Whereby, the gas flow passing through the plug member could be prevented from dropping dramatically or being cut off.

It must be pointed out that the embodiments described above are only some embodiments of the present invention. All equivalent structures which employ the concepts disclosed in this specification and the appended claims should fall within the scope of the present invention.

What is claimed is:

1. A plug member of a gas valve, having an axial bore located in an axial direction thereof, a first bore, and a second bore, which are located in a radial direction thereof, wherein the first bore and the second bore communicate with the axial bore, respectively; a cross-sectional diameter of the first bore is larger than a cross-sectional diameter of the second bore; the plug member is characterized in that:

a first guiding slot and a second guiding slot are recessed into an outer peripheral surface of the plug member, wherein the first guiding slot extends from the first bore to the second bore, and has a first end and a second end; the first end communicates with the first bore; the second end is near the second bore without physically communicating with the second bore; a width of the first guiding slot on the outer peripheral surface of the plug member decreases gradually from the first end to the second end; the second guiding slot extends from the second bore to the first bore, and has a third end and a fourth end; the third end communicates with the second bore; the fourth end is located between the first end and the second end of the first guiding slot without physically communicating with the first guiding slot, wherein the width of the second end of the first guiding slot converges to a pointed tip on the outer peripheral surface of the plug member.

2. The plug member of claim 1, wherein the fourth end of the second guiding slot is a tip.

3. The plug member of claim 1, wherein an extending direction of the first guiding slot is parallel to an extending direction of the second guiding slot.

4. The plug member of claim 1, wherein the second guiding slot comprises a first slot section connected to a second slot section; the first slot section has the third end, while the second slot section has the fourth end; the first slot section has a consistent width; a width of the second slot section decreases gradually from the first slot section to the fourth end.

5. The plug member of claim 1, wherein a width of the second guiding slot increases gradually from the fourth end to the second bore.

6. The plug member of claim 1, wherein a first oil groove is recessed into the outer peripheral surface of the plug member; the second end of the first guiding slot is located between the first oil groove and the second guiding slot.

7. The plug member of claim 1, wherein a second oil groove is recessed into the outer peripheral surface of the plug member; the second guiding slot is located between the second oil groove and the first guiding slot.

* * * * *